(12) United States Patent
Seo

(10) Patent No.: US 7,452,303 B2
(45) Date of Patent: Nov. 18, 2008

(54) EIGHT SPEED POWERTRAIN OF AUTOMATIC TRANSMISSION FOR VEHICLE

(75) Inventor: Kang Soo Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 211 days.

(21) Appl. No.: 11/641,405

(22) Filed: Dec. 19, 2006

(65) Prior Publication Data

US 2008/0108474 A1     May 8, 2008

(30) Foreign Application Priority Data

Nov. 8, 2006    (KR) .................. 10-2006-0110068

(51) Int. Cl.
*F16H 3/44*      (2006.01)

(52) U.S. Cl. .................. 475/284; 475/313; 475/325

(58) Field of Classification Search ............... 475/269, 475/284, 277, 278, 288, 311, 313, 323, 325
See application file for complete search history.

(56) References Cited

U.S. PATENT DOCUMENTS

| | | | |
|---|---|---|---|
| 6,723,018 B2 * | 4/2004 | Hayabuchi et al. | 475/276 |
| 6,960,149 B2 * | 11/2005 | Ziemer | 475/276 |
| 7,179,192 B2 * | 2/2007 | Park | 475/277 |
| 7,294,087 B2 * | 11/2007 | Hayabuchi et al. | 475/276 |

* cited by examiner

*Primary Examiner*—Roger Pang
(74) *Attorney, Agent, or Firm*—Morgan Lewis & Bockius LLP

(57) ABSTRACT

An eight speed powertrain of an automatic transmission can realize eight forward speed and one reverse speed by combining four planetary gear sets combined by a plurality of clutches and brakes and power delivery performance can be improved and fuel consumption can be reduced.

7 Claims, 3 Drawing Sheets

FIG. 2

| c | c1 | c2 | c3 | c4 | c5 | b1 | b2 |
|---|---|---|---|---|---|---|---|
| first forward speed |  | ● |  |  | ● |  | ● |
| second forward speed |  | ● | ● |  |  |  | ● |
| third forward speed |  | ● |  | ● |  |  | ● |
| fourth forward speed |  | ● | ● | ● |  |  |  |
| fifth forward speed |  | ● |  | ● | ● |  |  |
| sixth forward speed | ● | ● |  | ● |  |  |  |
| seventh forward speed | ● | ● |  |  | ● |  |  |
| eighth forward speed | ● | ● | ● |  |  |  |  |
| reverse speed |  |  | ● |  |  | ● | ● |

EIGHT SPEED POWERTRAIN OF AUTOMATIC TRANSMISSION FOR VEHICLE

CROSS-REFERENCE TO RELATED APPLICATION

This application claims priority to and the benefit of Korean Patent Application No. 10-2006-0110068 filed in the Korean Intellectual Property Office on Nov. 8, 2006, the entire contents of which are incorporated herein by reference.

BACKGROUND OF THE INVENTION (a) Field of the Invention

The present invention relates to an automatic transmission, and more particularly, to a powertrain of an automatic transmission.

(b) Description of the Related Art

A multi-stage gearshift mechanism of an automatic transmission includes a plurality of planetary gear sets. A powertrain having such a plurality of planetary gear sets varies the torque in multi-stages and outputs it to an output shaft when receiving a converted engine torque from a torque converter.

The more speeds the powertrain of an automatic transmission has, the better the power performance and fuel consumption. Therefore, it is desirable for powertrains to have as many speeds as possible but even for the same number of speeds, durability, power transmission efficiency, and size/weight of a transmission are substantially dependent on how planetary gear sets are arranged. Therefore, research for more structural strength, less power loss, and more compact packaging are continuously being conducted.

For a manual transmission, too many speeds cause a driver the inconvenience of excessive manual shifting. However, for an automatic transmission, a transmission control unit automatically executes shifting by controlling the operation of the power train, and therefore, more speeds usually implies more merits.

Accordingly, research of four-speed and five-speed powertrains has been undertaken, and recently, a powertrain of an automatic transmission enabling six forward speeds and one reverse speed has been developed. On the other hand, a development for the automatic transmission which can realize more speed implies more merits.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide an eight-speed powertrain of an automatic transmission having advantages of improving power delivery performance and reducing fuel consumption by combining four planetary gear sets and a plurality of clutches and brakes.

In one exemplary embodiment of an eight-speed powertrain of an automatic transmission includes a first planetary gear set including operational elements of a first sun gear, a first ring gear, and a first planet carrier, a second planetary gear set including g operational elements of a second sun gear, a second ring gear, and a second planet carrier, a third planetary gear set including operational elements of a third sun gear, a third ring gear, a third planet carrier, a fourth planetary gear set including operational elements of a fourth sun gear, a fourth ring gear, a fourth planet carrier an input shaft, at least one output gear, and a transmission case wherein the first sun gear is fixedly connected to the transmission case so as to always operate as a fixed element, the first planet carrier is fixedly connected to the second ring gear, the second sun gear is fixedly connected to the input shaft so as to always operate as an input element, the third ring gear and the fourth ring gear are integrally formed and fixedly connected to the output gear so as to operate as an output element, the first ring gear is variably connected to the third sun gear via a first clutch, the second ring gear is variably connected to the input shaft via a second clutch, the first ring gear is variably connected to the fourth sun gear via a third clutch, the fourth planet carrier is variably connected to the input shaft via a fourth clutch, the fourth sun gear is variably connected to the input shaft via a fifth clutch, the second planet carrier is variably connected to the transmission case via a first brake, and the third sun gear is variably connected to the transmission case via a second brake.

The third planetary gear set comprises a double pinion planetary gear set comprising double pinions supported by the third planet carrier.

The fourth pinion gear supported by the fourth planet carrier is integrally formed with one of the double pinions.

The first, the second, the third, the fourth planetary gear sets are disposed in order of the first planetary gear set, the second planetary gear set, the third planetary gear set, and the fourth planetary gear set.

The first clutch and the first brake are disposed in a direction of the first planetary gear set.

The second, the third clutches and the second brake are disposed between the second planetary gear set and the third planetary gear set.

BRIEF DESCRIPTION OF THE DRAWINGS

FIG. 2 shows an operational chart of a powertrain according to an exemplary embodiment of the present invention.

DETAILED DESCRIPTION OF THE EMBODIMENTS

An exemplary embodiment of the present invention will hereinafter be described in detail with reference to the accompanying drawings.

Figure 1:
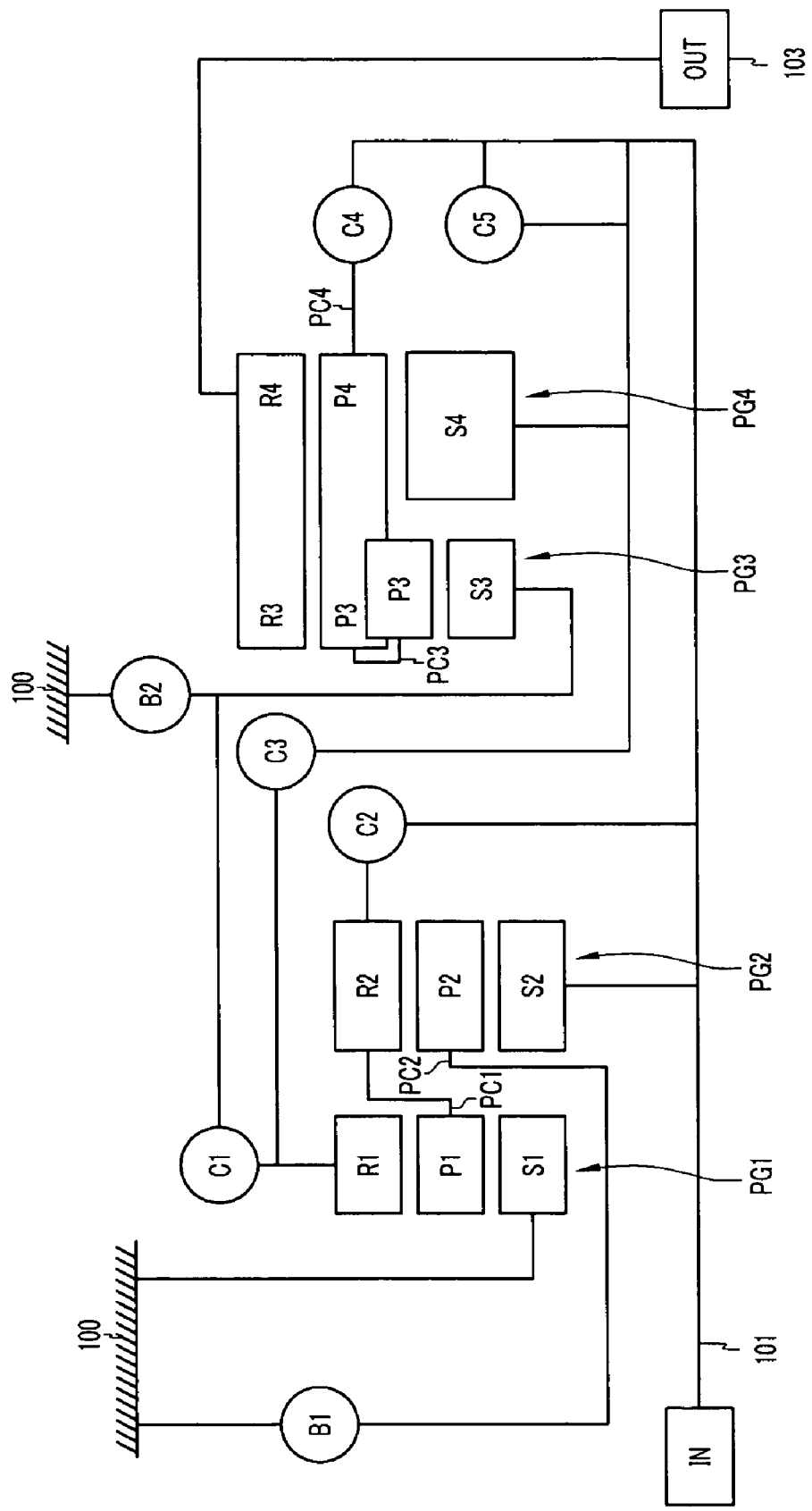
FIG. 1 shows a powertrain of an automatic transmission for a vehicle according to an exemplary embodiment of the present invention.

As shown in FIG. 1, according to an exemplary embodiment of the present invention, an eight-speed powertrain of an automatic transmission includes a first, a second, a third, and a fourth planetary gear sets PG1, PG2, PG3, and PG4.

The first planetary gear set PG1 which is a single pinion planetary gear set includes operational elements of a first sun gear S1, a first ring gear R1, and a first planet carrier PC1. A first pinion gear P1 geared with the first ring gear R1 and the first sun gear is connected to the first planet carrier PC1.

The second planetary gear set PG2 which is the single pinion planetary gear set includes operational elements of the second sun gear S2, the second ring gear R2, and the second planet carrier PC2. A second pinion gear P2 geared with the second ring gear R2 and the second sun gear S2 is connected to the second planet carrier PC2.

The third planetary gear set PC3 which is a double pinion planetary gear set includes operational elements of the third sun gear S3, the third ring gear R3, and the third planet carrier PC3. Two third pinion gear P3 geared with the third ring gear R3 and the third sun gear S3 is connected to the third planet carrier PC3.

The fourth planetary gear set PG4 which is the single pinion planetary gear set includes operational elements of the fourth sun gear S4, the fourth ring gear R4, and the fourth planet carrier PC4. A fourth pinion gear P4 geared with the fourth ring gear R4 and the fourth sun gear S4 is connected to the fourth planet carrier PC4.

The first sun gear S1 is fixedly connected to the transmission case 100 so as to operate as a fixed element.

The first planet carrier PC1 is fixedly connected to the second ring gear R2.

The second sun gear S2 is fixedly connected to an input shaft 101 so as to operate as an input element.

The third ring gear R3 and the fourth ring gear R4 are integrally formed and are fixedly connected to an output gear 103 so as to operate as an output element.

The first ring gear R1 is variably connected to the third sun gear S3 via a first clutch C1.

The second ring gear R2 is variably connected to the input shaft 101 via a second clutch C2.

The first ring gear R1 is variably connected to the fourth sun gear S4 via a third clutch C3.

The fourth planet carrier PC4 is variably connected to the input shaft via a fourth clutch C4.

The fourth sun gear S4 is variably connected to the input shaft via a fifth clutch C5.

The second planet carrier PC2 is variably connected to the transmission case 100 via a first brake B1.

The third sun gear S3 is variably connected to the transmission case 100 via a second brake B2.

The third planetary gear set PC3 is a double pinion planetary gear set including a double pinion supported by the third planet carrier PC3.

The fourth pinion gear P4 supported by the fourth planet carrier PC4 is integrally formed with one of the double pinion.

That is, it is called that Ravingneaux type planetary gear set including the third planetary gear set PC3 and the fourth planetary gear set PG4 totally.

As shown in FIG. 1, the first, the second, the third, and the fourth planetary gear sets PG1, PG2, PG3, and PG4 are disposed in order of the first planetary gear set PG1, the second planetary gear set PG2, the third planetary gear set PC3, and the fourth planetary gear set PG4.

The first clutch C1 and the first brake B1 are disposed in a direction of the first planetary gear set PG1.

The second and the third clutches C2 and C3 and the second brake B2 are disposed between the second planetary gear set PG2 and the third planetary gear set PC3.

Hereinafter, according to an exemplary embodiment of the present invention, an operation of the eight-speed powertrain of an automatic transmission is described.

FIG. 2 shows an operational chart of a powertrain according to an exemplary embodiment of the present invention.

According to an exemplary embodiment of the present invention, such an eight-speed powertrain of an automatic transmission may be operated according to an operational chart shown in FIG. 2, to realize eight forward speeds and one reverse speed. That is, the second clutch C2, the fifth clutch C5, and the second brake B2 are operated for the first forward speed, the second clutch C2, the third clutch C3, and the second brake B2 are operated for the second forward speed, the second clutch C2, the fourth clutch C4, and the second brake B2 are operated for the third forward speed, the second, the third, the fourth clutch C2, C3, and C4 are operated for the fourth forward speed, the second, the fourth, the fifth clutches C2, C4, and C5 are operated for the fifth forward speed, the first, the second, and the fourth clutches C1, C2, and C4 are operated for the sixth forward speed, the first, the second, the fifth clutches C1, C2, and C5 are operated for the seventh forward speed, and the first, the second, the third clutches C1, C2, and C3 are operated for the eighth forward speed In addition, the third clutch C3 and the first, the second brakes B1 and B2 are operated for the reverse speed.

Figure 3:
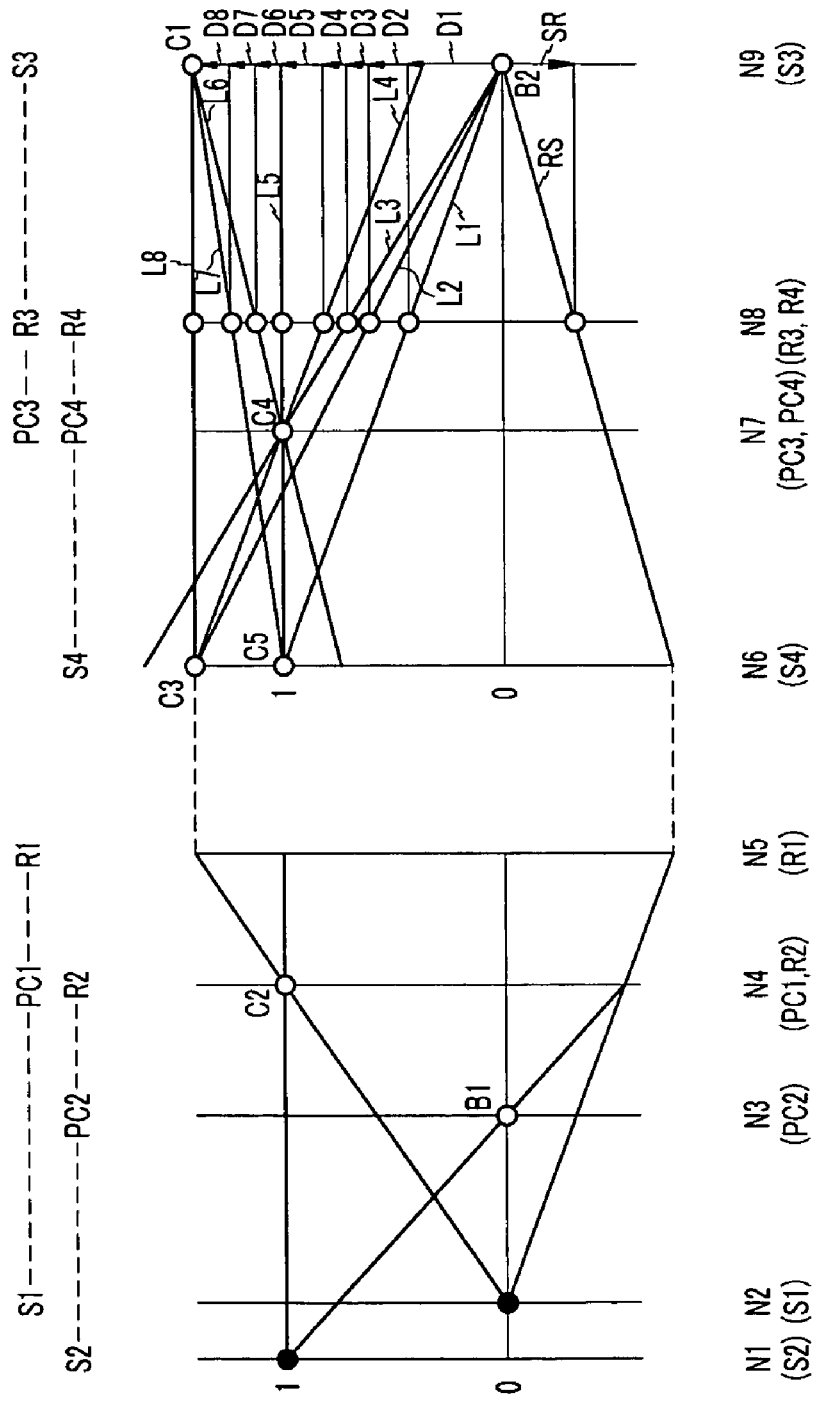
FIG. 3 shows a shift diagram of a powertrain according to an exemplary embodiment of the present invention.

FIG. 3 shows a shift diagram of a powertrain according to an exemplary embodiment of the present invention.

The first sun gear S1, the first planet carrier PC1, and the first ring gear R1 of the first planetary gear set PG1 are formed as successive three operational nodes N2, N4, and N5 on the shift diagram.

The second sun gear S2, the second planet carrier PC2, and the second ring gear R2 of the second planetary gear set PG2 are formed as successive three operational nodes N1, N3, and N4 on the shift diagram.

The third planet carrier PC3, the third ring gear R3, and the third sun gear S3 of the third planetary gear set PC3 are formed as successive three operational nodes N7, N8, and N9 on the shift diagram.

The fourth sun gear S4, the fourth planet carrier PC4, and the fourth ring gear R4 of the fourth planetary gear set PG4 are formed as successive three operational nodes N6, N7, and N8 on the shift diagram.

As described above, the input shaft 101 is fixedly connected to the second sun gear S2, is variably connected to the second ring gear R2 via the second clutch C2, is variably connected to the fourth planet carrier PC4 via the fourth clutch C4, and is variably connected to the fourth sun gear S4 via the fifth clutch C5.

Therefore, an engine rotation speed input from input shaft 101 is transmitted to the first node N1 and is transmitted to the fourth, the sixth, the seventh operational nodes N4, N6, and N7 by operations of the second, the fourth, the fifth clutches C2, C4, and C5.

In addition, the second planet carrier PC2 is variably connected to the transmission case 100 via the first brake B1.

Therefore, the third node N3 acts as a fixed element by an operation of the first brake B1.

The second sun gear S2 is fixedly connected to the transmission case 100.

Therefore, the second node N2 always acts as a fixed element.

The third sun gear S3 is variably connected to the transmission case 100 via the second brake B2.

Therefore, the ninth node N9 acts as a fixed element by an operation of the second brake B2.

Hereinafter, a shifting operation of the exemplary powertrain according to an embodiment of the present invention will be described in detail First, for the first forward speed, the second and the fifth clutch C2 and C5 and the second brake B2 are operated.

Therefore, the first and the fourth nodes N1 and N4 receive an engine speed from the input shaft 101 and the first and the second planetary gear sets PG1 and PG2 are freely rotate since the first and the third clutches C1 and C3 are disengaged.

In addition, the sixth node N6 receives the engine speed since the fifth clutch C5 is operated and the ninth node N9 acts as a fixed element since the second brake B2 is engaged.

Therefore, a speed line of the first forward speed is formed as a speed line L1 and the output element of the eighth node N8 rotates at a speed D1 and the first forward speed is realized.

For the second forward speed, the fifth clutch C5 is released and the third clutch C3 is operated from the first forward speed.

Therefore, the second node N2 always acts as a fixed element and a rotation speed from the fifth node N5 is transmitted to the sixth node N6 since the fourth node N4 receives an engine speed.

In addition, the ninth node N9 acts as a fixed element since the second brake B2 is operated.

Therefore, a speed line of the second forward speed is formed as a speed line L2, the output element of the eighth node N8 rotates at a speed D2 and the second forward speed is realized.

For the third forward speed, the third clutch C3 is released and the fourth clutch C4 is operated from the second forward speed.

That is, the first and the second planetary gear set PG1 and PG2 freely rotate and the seventh node N7 the engine speed.

In addition, the ninth node N9 acts as a fixed element since the second brake B2 is operated.

Therefore, a speed line of the third forward speed is formed as a speed line L3, the output element of the eighth node N8 rotates at a speed D3 and the third forward speed is realized.

For the fourth forward speed, the second brake B2 is released and the third clutch C3 is operated from the third forward speed.

That is, like the second forward speed, the rotation speed is transmitted to the sixth node N6 and the seventh node N7 receives the engine speed from the input shaft 101 since the fourth clutch C4 is operated.

Therefore, a speed line of the fourth forward speed is formed as a speed line L4, the output element of the eighth node N8 rotates at a speed D4 and the fourth forward speed is realized.

For the fifth forward speed, the third clutch C3 is released and the fifth clutch C5 is operated from the fourth forward speed.

Then, the first and the second planetary gear sets PG1 and PG2 freely rotate, the seventh node N7 and the sixth node N6 receives the engine speed since the fourth and the fifth clutch C4 and C5 are operated and each node rotates at the same speed with the speed of the input shaft 101.

Therefore, a speed line of the fifth forward speed is formed as a speed line L5, the output element of the eighth node N8 rotates at a speed D5, and the fifth forward speed is realized.

For the sixth forward speed, the fifth clutch C5 is released and the first clutch C1 is operated from the fifth forward speed.

The fourth node N4 receives the engine speed by an operation of the second clutch C2 and the second node N2 acts as a fixed element.

The rotation speed is transmitted from the fifth node N5 to the ninth node N9 by an operation of the first clutch C1 and the seventh node N7 receives the engine speed by an operation of the fourth clutch C4.

Therefore, a speed line of the sixth forward speed is formed as a speed line L6, the output element of the eighth node N8 rotates at a speed, and the sixth forward speed is realized.

For the seventh forward speed, the fourth clutch C4 is released and the fifth clutch C5 is operated from the sixth forward speed.

That is, like the sixth forward speed, the rotation speed is transmitted from the fifth node N5 to the ninth node N9 by an operation of the first clutch C1 and the sixth node N6 receives the engine speed by an operation of the fifth clutch C5.

Therefore, a speed line of the seventh speed is formed as a speed line L7, the output element of the eighth node N8 rotates at a speed D7, and the seventh forward speed is realized.

For the eighth forward speed, the fifth clutch C5 is released and the third clutch C3 is operated from the seventh forward speed.

That is, the rotation speed is transmitted from the fifth node N5 to the sixth, the ninth node N6 and N9 by operations of the first and the third clutches C1 and C3.

Therefore, a speed line of the eighth speed is formed as a speed line line L8, the output element of the eighth node N8 rotates at a speed D8, and the eighth forward speed is realized.

For reverse speed, the third clutch C3 and the first and the second brakes B1 and B2 are operated.

That is, a reduced rotation speed from the fifth node N5 is input to the sixth node N6 by the third clutch C3 and the third and the ninth nodes N3 and N9 act as a fixed element by operations of the first and the second brakes B1 and B2.

Therefore, a speed line of reverse speed is formed as a speed line RS, the output element of the eighth node N8 rotates at a speed SR, and the reverse speed is realized.

According to an exemplary embodiment of the present invention, three simple planetary gear set and a double pinion planetary gear set (two single pinion planetary gear set and one Ravingneaux type planetary gear set) can realize eighth forward speed and one reverse speed by combining five clutches and two brakes and power delivery performance can be improved and fuel consumption can be reduced by effectively utilizing a power of an engine.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An eight-speed powertrain of an automatic transmission, comprising:

a first planetary gear set comprising operational elements of a first sun gear, a first ring gear, and a first planet carrier;

a second planetary gear set comprising operational elements of a second sun gear, a second ring gear, and a second planet carrier;

a third planetary gear set comprising operational elements of a third sun gear, a third ring gear; a third planet carrier; and a fourth planetary gear set comprising operational elements of a fourth sun gear, a fourth ring gear, a fourth planet carrier; an input shaft, at least one output gear, and a transmission case; wherein:

the first sun gear is fixedly connected to the transmission case so as to operate as a fixed element;

the first planet carrier is fixedly connected to the second ring gear;

the second sun gear is fixedly connected to the input shaft so as to operate as an input element, the third ring gear and the fourth ring gear are formed together and fixedly connected to the output gear so as to operate as an output element, the first ring gear is variably connected to the third sun gear via a first clutch, the second ring gear is variably connected to the input shaft via a second clutch, the first ring gear is variably connected to the fourth sun gear via a third clutch, the fourth planet carrier is variably connected to the input shaft via a fourth clutch, the fourth sun gear is variably connected to the input shaft via a fifth clutch, the second planet carrier is variably connected to the transmission case via a first brake, and the third sun gear is variably connected to the transmission case via a second brake.

2. The eight-speed powertrain of claim 1, wherein: the third planetary gear set comprises a double pinion planetary gear set comprising double pinions supported by the third planet carrier.

3. The eight-speed powertrain of claim 2, wherein: the fourth pinion gear supported by the fourth planet carrier is integrally formed with one of the double pinions.

4. The eight-speed powertrain of claim 1, wherein: the first, the second, the third, the fourth planetary gear sets are disposed in order of the first planetary gear set, the second planetary gear set, the third planetary gear set, and the fourth planetary gear set.

5. An eight-speed powertrain of claim 1, wherein: the first clutch and the first brake are disposed in a direction of the first planetary gear set.

6. An eight-speed powertrain of claim 1, wherein: the second, the third clutches and the second brake are disposed between the second planetary gear set and the third planetary gear set.

7. The eight-speed powertrain of claim 1, wherein the third ring gear and fourth ring gear are integrally formed as a unit.

* * * * *